(12) United States Patent
Houchen

(10) Patent No.: US 7,272,116 B1
(45) Date of Patent: Sep. 18, 2007

(54) PROTOCOL FOR AUTOMATIC TRAFFIC PROVISIONING IN 4-FIBER BLSR SONET NETWORKS

(75) Inventor: Stephen H. Houchen, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 960 days.

(21) Appl. No.: 09/607,593

(22) Filed: Jun. 30, 2000

(51) Int. Cl.
*H04L 12/28* (2006.01)
(52) U.S. Cl. .................................... 370/258; 370/389
(58) Field of Classification Search ............... 370/224, 370/249, 403, 404, 405, 406, 452, 460, 907
See application file for complete search history.

(56) References Cited

U.S. PATENT DOCUMENTS

| | | | |
|---|---|---|---|
| 5,412,652 A | 5/1995 | Lu | 370/223 |
| 5,446,737 A | 8/1995 | Cidon et al. | 370/452 |
| 5,781,537 A | 7/1998 | Ramaswami et al. | 370/254 |
| 6,104,700 A | 8/2000 | Haddock et al. | 370/235 |
| 6,308,228 B1 | 10/2001 | Yocum et al. | 710/52 |
| 6,314,110 B1 | 11/2001 | Chin et al. | 370/468 |
| 6,393,026 B1 | 5/2002 | Irwin | 370/401 |
| 6,449,650 B1 | 9/2002 | Westfall et al. | 709/228 |
| 6,510,135 B1 | 1/2003 | Almulhem et al. | 370/229 |
| 6,594,279 B1 | 7/2003 | Nguyen et al. | 370/468 |

*Primary Examiner*—Frank Duong
(74) *Attorney, Agent, or Firm*—Campbell Stephenson LLP

(57) ABSTRACT

A protocol and method for provisioning traffic routes in a BLSR SONET network includes request packets that are broadcast from the source node to neighboring nodes. The neighboring nodes determine whether the route associated with a request packet requires less cost than other request packets previously transmitted by the node, or whether the cost exceeds that of the best response seen by the node so far. If the cost is less, the route in the request packet is updated and the request packet is broadcast to the next neighboring node. If a request packet is received more than once at the same node, the request packet is discarded. When the destination node receives a request packet, it generates a response packet that is propagated through neighboring nodes back toward the source node. If the cost associated in the route is higher than another route known by a node, the response packet is discarded. The source node receives the response packets, determines the route with the lowest cost, and issues a connect packet to establish cross-connects between nodes in the route. The source node may also issue a disconnect packet to dismantle a route.

45 Claims, 8 Drawing Sheets

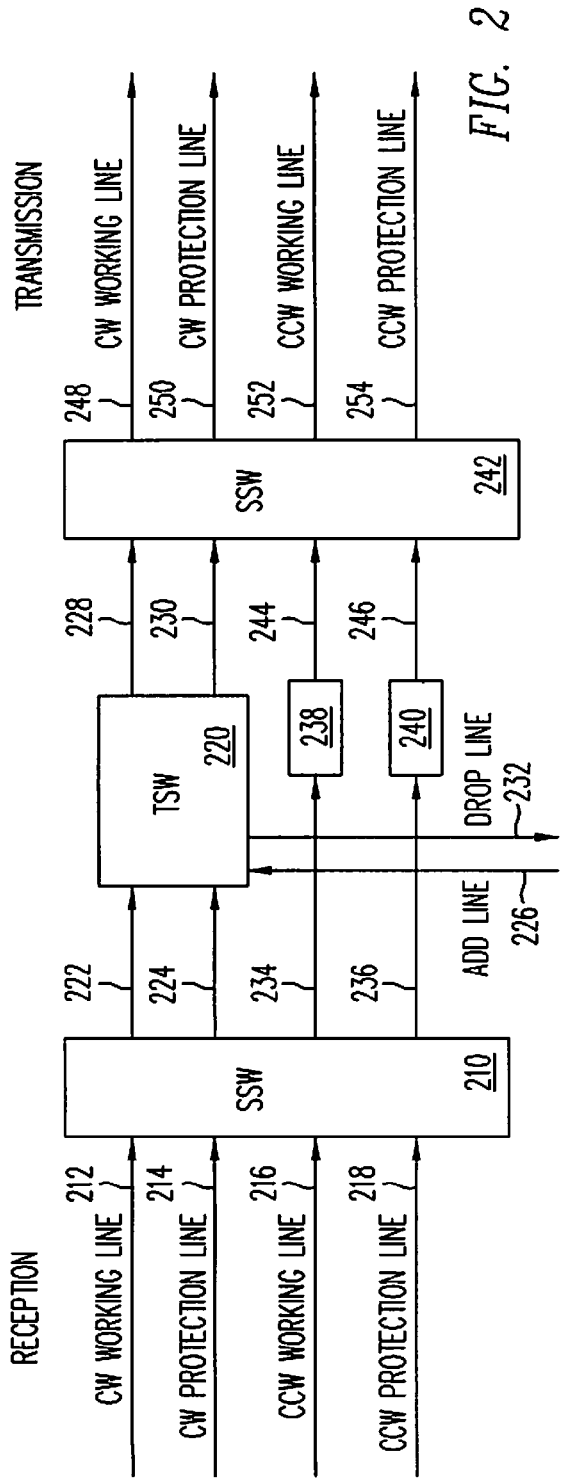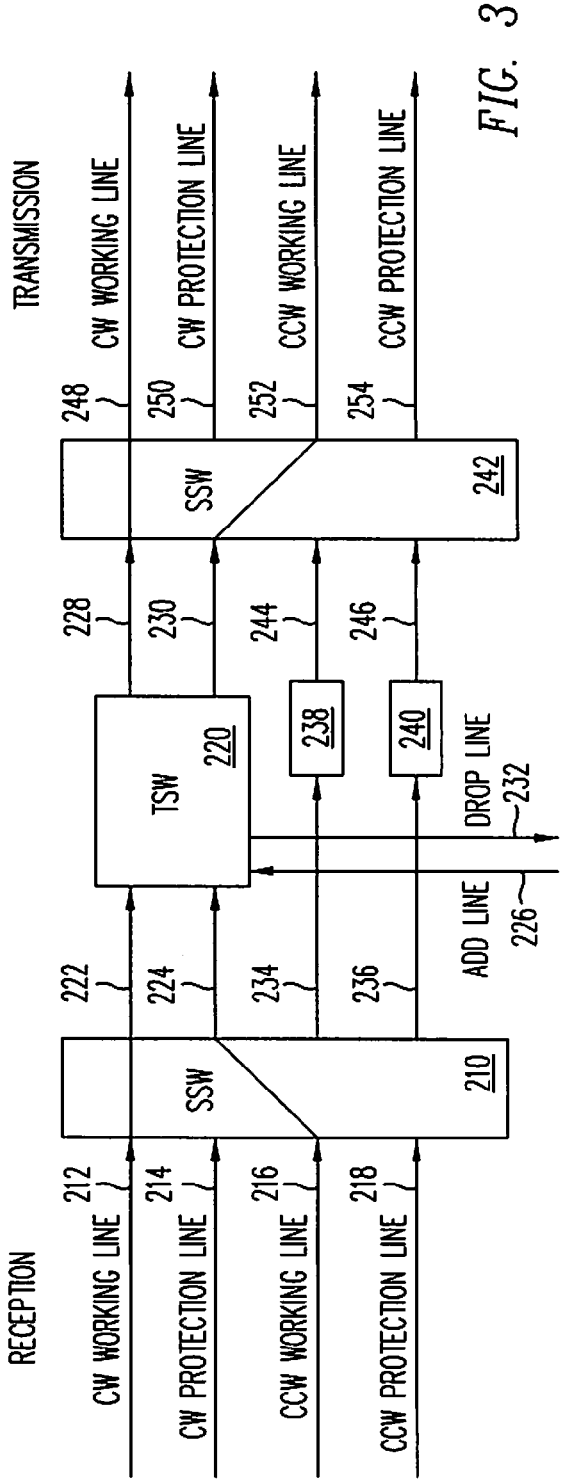

PROTOCOL FOR AUTOMATIC TRAFFIC PROVISIONING IN 4-FIBER BLSR SONET NETWORKS

BACKGROUND OF THE INVENTION

1. Field of the Invention

This invention generally relates to the field of traffic provisioning in a data network. More specifically, this invention relates to automating the process of establishing cross-connections.

2. Description of the Related Art

Synchronous Optical Network (SONET) is a high-speed synchronous network specification for optical fiber networks. The provisioning of traffic paths across a network of (SONET) multiplexers usually entails manually finding the route and sufficient bandwidth to fulfill the request. Human intervention is required at each network element to establish the correct cross-connects. Such a process can be tedious, time consuming, and error-prone. It is therefore desirable to provide a system capable of automatically provisioning traffic paths from one network element to another across a network of one or more interconnected network elements.

SUMMARY OF THE INVENTION

The present invention provides a protocol and method for provisioning traffic routes in a BLSR SONET network including request packets that are broadcast from the source node to neighboring nodes. The neighboring nodes determine whether the route associated with a request packet requires less cost than other request packets previously received by the node. If the cost is less, the route in the request packet is updated and the request packet is broadcast to the next neighboring nodes. If a request packet is broadcast more than once to the same node, the request packet is discarded. When the destination node receives a request packet, it generates a response packet that is propagated through neighboring nodes back toward the source node. If the cost associated in the route is higher than another route known by a node, the response packet is discarded. The source node receives the response packets, determines the route with the lowest cost, and issues a connect packet to establish cross-connects between nodes in the route. The source node may also issue a disconnect packet to dismantle a route.

In one embodiment, the protocol of the present invention includes a request packet that includes information regarding the route. This information includes a value indicating the number of network elements included in the route, a value indicating the number of rings included in the route, a sequence number with respect to the source node, the destination node, a timeout value, and an identifier for each node in the route. The request packet may further include a value representing the bandwidth required to transport a data packet along the route.

A feature of the identifier for each node in the route is a route subfield that includes a network element identifier for each node, a port identifier for each node, and a timeslot for each node.

Another feature of the protocol is a response packet that includes a value indicating the number of network elements included in the route, a value indicating the number of rings in the route, the destination node, the sequence number with respect to the source node, and an identifier for each node in the route.

Another feature of the protocol is a connect packet that includes a value indicating the number of network elements included in the route, a value indicating the number of rings included in the route, the destination node, and an identifier for each node in the route.

Another feature of the protocol is a disconnect packet that includes the beginning STS-1 timeslot at the source node and the amount of bandwidth to free up. The disconnect packet may be used to dismantle a route, whether it was provisioned manually or automatically using the present protocol.

Another feature of the protocol is a local data structure at each node that has received a request packet. The local data structure includes information regarding the route with the least cost.

In another embodiment, the method for provisioning a traffic route in a network according to the present invention includes:

generating a request packet in a source node;
broadcasting the request packet to other nodes in the network, wherein each node conditionally broadcasts the request packet to neighboring nodes;
generating a response packet when a request packet reaches the destination node;
broadcasting the response packet to other nodes in the network, wherein each node conditionally broadcasts the request packet to neighboring nodes;
receiving the response packets in the source node; and
selecting the route to the destination node based on the routes in the response packets.

When broadcasting the request packet to other nodes in the network, it is determined whether the route in the most recently received request packet in the node requires less cost to travel to the next node than routes in previously transmitted request packets. When the route costs more to travel to the node than routes in previously received response packets, the most recently received response packet in the node is discarded.

One process included in the method is generating a local structure in each node to store information on the route that requires the least cost to travel to the node compared to other routes in previously received request packets.

Another process included in the method is discarding request packets that are broadcast to the same node more than once.

Another process included in the method is generating a connect packet based on the selected route, and broadcasting the connect packet to all neighboring nodes.

Another process included in the method is generating a disconnect packet, and broadcasting the disconnect packet to the nodes in the route to dismantle the route.

Another process included in the method is starting a timer in the source node when request packets are broadcast, and broadcasting a null connect packet when the timer expires before a route between the source node and the destination node can be found.

Advantages to the protocol and method of the present invention include maintaining the network in a deterministic state due to the features that provide an indication of whether or not a traffic route could be provisioned, and to the BLSR network which uses protection lines for transmitting data if a working line fails. The present invention also optimizes the route between the source node and destination node in terms of ring hops and span traversals. Further, the process of establishing traffic routes across a network, although not time critical, finishes within a reasonable time. It also requires little memory at each node since no routing tables are kept permanently. The process of establishing a traffic route is simple and the protocol uses as few packets as possible to accomplish its goal.

The foregoing has outlined rather broadly the objects, features, and technical advantages of the present invention so that the detailed description of the invention that follows may be better understood.

BRIEF DESCRIPTION OF THE DRAWINGS

FIG. 2 is a block diagram of a STS switch in one of the nodes of the BLSR in FIG. 1.

FIG. 3 is a block diagram of signals connections that result when a failure has occurred in a CW working line between two nodes.

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

Figure 1:
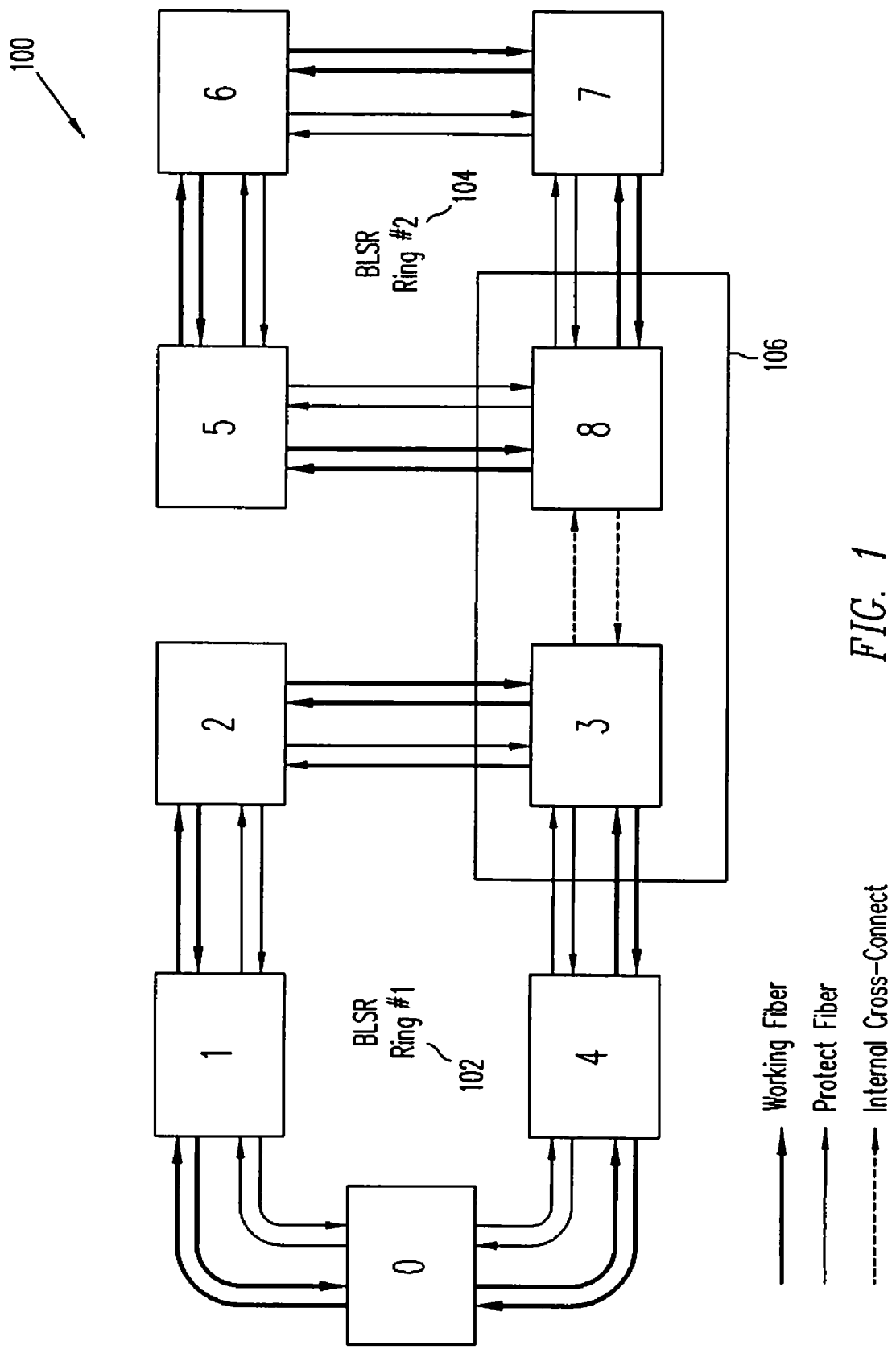
FIG. 1 is a block diagram of nodes in a couple of four-fiber Bi-directional Line-Switched Ring (BLSR) networks having a cross-connect between the rings.

FIG. 1 shows an example of what is commonly called a four-fiber Bi-directional Line-Switched Ring (BLSR) network 100. The figure below shows a typical network consisting of two interconnected rings 102, 104. BLSR nodes 3 and 8, although parts of two distinct rings, are physically within the same network element 106. A network element is any device that is part of a SONET transmission path and serves one or more of the section, line, and path-terminating functions. In SONET, the five basic network elements are add/drop multiplexers, broadband digital cross-connects, wideband digital cross-connects, digital loop carriers, and switch interfaces, as known in the art. A network element has a given number of ports, for example 1024. Each port has an incoming fiber and/or and outgoing fiber.

In order to provision traffic entering the rings at one node and leaving at another, the prior art method entails manually determining which nodes will be needed to carry the bandwidth, selecting the appropriate timeslots, and sending the commands to each node.

This process of provisioning traffic can be automated using the protocol and handlers of the present invention. For example, a single command is used to establish a traffic route between Node 0 and Node 5. Assuming there are currently no connections between nodes, the optimal route would be nodes 0-4-3-8-5 since this minimizes the cost (one Ring Hop and three Span Traversals). Node 0 would connect its tributary (specified manually) towards node 4. Node 4 would have a Thru Cross-Connect towards node 3. The NE 106 containing nodes 3 and 8 would connect node 3's incoming port to node 8's outgoing port. Node 5, finally, would connect its incoming port from node 8 to its drop port (again specified manually). Another command could be issued to completely disconnect the same traffic route. The Cross-Connect at each NE, such as NE 106, along the path would be taken down, freeing the bandwidth.

SONET is a physical data transmission vehicle that is defined by a set of electrical as well as optical standards. The basic building block in SONET is the synchronous transport signal level-1 (STS-1). It is transported as a 51.840 Megabits per second serial transmission using an optical carrier level-1 (OC-1) optical signal. The grouping of a specified set of bytes in the STS-1 is called a frame. An STS-1 frame consists of 810 bytes (6480 bits). Optical carrier level-N (OC-N) and synchronous transport signal level-N (STS-N) correspond to the optical and electrical transmissions respectively, of the same data rate. Higher data rates are transported in SONET by synchronously multiplexing N lower level modules together. For example, OC-3/STS-3 corresponds to a line rate of 155.52 (3 times 51.840) Megabits per second, and OC-48 corresponds to 2488.32 (48 times 51.840) Megabits per second.

The STS-1 frame structure has two parts, the transport overhead and the synchronous payload envelope (SPE). The payload and path overhead bytes are mapped into the SPE in the path layer. Associated with the path layer are some additional bytes referred to as path overhead (POH) bytes, which are also placed into the SPE. After the formation of the SPE, the SPE is placed into the frame along with some additional overhead bytes, which are referred to as line overhead (LOH) bytes. The LOH bytes are used to provide information for line protection and maintenance purposes. This LOH is created and used by line terminating equipment such as multiplexers. The next layer is defined as the section layer and it is used to transport the STS-N frame over a physical medium. Associated with this layer are the section overhead (SOH) bytes, which are used for framing, section error monitoring, and section level equipment communications. The physical layer is the final layer and transports bits serially as either optical or electrical entities. There are no defined overhead bytes at the physical layer.

A concatenated STS (STS-Nc) is a number of STS-1s that are kept together. The multiples of the STS-1 rate are mapped into an STS-Nc SPE. The STS-Nc is multiplexed, switched, and transported as a single unit. Only one set of STS POH is used in the STS-Nc.

FIG. 2 shows a basic construction of a three-stage switch used for a node in ring networks 102, 104 shown in FIG. 1. A first stage space division switch (SSW) 210 has four inputs and four outputs and accommodates a CW working line 212, a CW protection line 214, a CCW working line 216 and a CCW protection line 218. A second stage time division switch (TSW) 220 has three inputs and three outputs and accommodates two (222 and 224) of the outputs of the first stage space division switch 210 and an add line 226. Two (228 and 230) of the outputs of the time division switch 220 are connected to a third stage space division switch 242 and one of them serves as a drop line 232. Outputs 234 and 236 of the space division switch 210 are connected to delay inserters 238 and 240, respectively, which cause delays in signals on the highways 234 and 236. The delays created here are equal to that created in the time division switch 220. The delay inserters 238 and 240 are readily constructed by a random access memory (RAM). Four lines, that is, two (228 and 230) of the outputs of the second stage time-division switch 220 and two (244 and 246) of the outputs of the delay inserters 238 and 240 are connected to the input of the third stage space division switch (SSW) 242.

FIG. 3 shows processes of one of the nodes in a normal state. A space division switch 210 connects a CW working line 212 to a highway 222. It also connects a CCW working line 216 to a highway 224. A time division switch 220 conducts relay/add/drop processes. A space division switch 242 connects output highways 228 and 230 of the time division switch 220 to a CW working line 248 and a CCW working line 252, respectively. Similar processes are conducted in the other nodes using their own respective switches.

Four fiber BLSR network 100 includes two protection input lines 214, 218, and two protection output lines 250, 254. When a failure occurs, the traffic is detoured from the working line to the protection line by a TSI (time slot interchange). For example, if a failure occurs in only the CW working line 248, the node outputs the traffic which has been heretofore output to CW working line 248, to the protection line 250 by using the TSI function. The outputted traffic passes through the protection line 250 and reaches a target point. When failures occur in both the CW working line 248 and the protection line 250, the node outputs the traffic which was previously output to the left working line 248, to the opposite protection line 254. The output traffic goes around the ring in the reverse direction to that prior to the occurrence of the failure and reaches a target point to recover from the failure.

Figure 4:
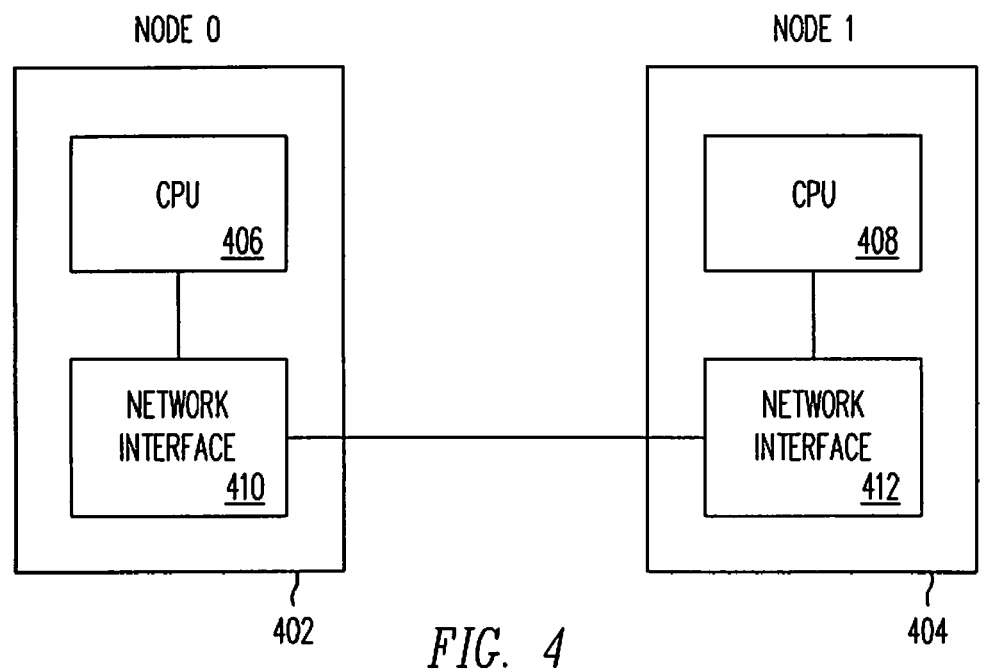
FIG. 4 is a diagram of components included in two nodes that are connected through a network interface.

Referring now to FIG. 4, two nodes 402, 404 are shown with each including a central processing unit (CPU) 406, 408, and connected for communication through network interface units 410, 412. Network interface units 410, 412 include components to transmit and receive data packets to and from other nodes in a network, such as network 100 (FIG. 1). The components may be implemented in hardware, software, firmware, or a combination of hardware, software, and/or firmware.

There are a variety of known network topologies and communication protocols that may be utilized in the network. The present invention provides a protocol that determines a route for establishing a circuit between a source node and a destination node. The present invention is utilized with a four fiber BLSR SONET network 100 as described above. SONET networks allow different types of formats to be transmitted on one line and include the ability to add and drop signals with a single multiplexer.

Communication between different networks requires multiplexing/demultiplexing, coding/decoding processes to convert a signal from one format to another format. To solve this problem SONET standardize the rates and formats of data transmitted in a network. The Synchronous Transport Signal (STS) is the basic building block of SONET optical interfaces and consists of two parts, the STS data communication channel (DCC) and the STS overhead channel which includes the signaling and protocol information. A signal is converted to STS and travels through various SONET networks in the STS format until it terminates. The terminating equipment converts the STS to the user format.

In one embodiment, the protocol associated with the present invention is carried over the STS data communication channel (DCC) or in any unused (proprietary) bytes in the SONET overhead channel. Another alternative is to carry the information in packets associated with another type of networking system besides SONET. A further alternative is to include the protocol information in a standalone packet and supply a separate handler for the network interface 410, 412 in each node to generate and utilize the protocol information for the present invention.

The protocol of the present invention includes Request Packets, Response packets, Connect packets, Disconnect packets, and local data structures on the nodes that are used while the traffic route is being determined. The information included in one embodiment of each of these packets and data structures is described below.

Request Packets

Request packets contain partial routes that are used to build the final traffic path and include the following information:

| | | | Request Packet Format | | | | |
|---|---|---|---|---|---|---|---|
| Type | Hop Count | Span Count | Dest | Seq No | Width | Timeout | Route |
| 0 | So far | So far | | Wrt Source | #STS-1s | Seconds | See Below |

The parameter "Type" refers to the type of traffic provisioning protocol packet. In this example, Type 0 denotes a Request packet. The "Hop Count" parameter denotes the number of cross-connections where the endpoints belong to different rings. In one embodiment, for example, the Hop Count is always one less than the number of rings in the route, so a route within a single ring has a Hop Count of zero. The "Span Count" parameter denotes the number of consecutive pairs of network elements the traffic path passes, i.e., the number of fibers traversed. In one embodiment, the Span Count is always one less than the number of network elements in the route. For example, in FIG. 1, a route from node 4 to node 7 has a Span Count of 2 and a Hop Count of 1.

The "Dest" parameter denotes the destination node. The "Seq No" parameter begins at zero and increments with each request packet issued by the source node. It is used by other nodes t distinguish requests from the same source node. The "Width" parameter denotes the number of STS-1's needed to fulfill the request. The "Timeout" parameter denotes the amount of time allotted to determine the route. Before transmitting the packets from the source node, a timer is started with a duration corresponding to the value in the Timeout field. The Route field is a variable-length structure that is included in several packet types. Its length is known because it will always have SpanCount repetitions of the NE, Port, and Timeslot trio of fields. Note that the Destination node does not appear in the Route. The Route subfield is defined as follows:

| | | Route subfield format | | | | |
|---|---|---|---|---|---|---|
| NE | Port | Timeslot | NE | Port | Timeslot | Etc. |

In the route subfields, NE refers to a network-unique two-byte identifier for a NE. Port indicates the local port number through which the route leaves that NE. Timeslot specifies the first STS-1 timeslot for the bandwidth that leaves the NE on the given port. A SONET OC-N signal is composed of N STS-1 signals. If a cross-connection with a bandwidth of 48 STS-1s is requested, this will fit into one-fourth of an OC-192. The timeslot is used to specify which one-fourth to use. For example, an OC-192 would allow timeslots of 0, 48, 96, or 144 to indicate the beginning timeslot for the requested bandwidth of 48. The network element receiving the packet then has knowledge of which portion of the OC-192 has the route.

The Response Packet

Response packets are transmitted from the nodes to the source node and contain route information that describes a potential traffic path.

Response packet format

| Type | HopCount | SpanCount | Dest | Seq No | Route |
|------|----------|-----------|------|--------|-------|
| 1 | Total | Total | Dest | Relative to the Source | see above |

The Connect Packet

Connect packets describe the chosen route (if any) for the traffic path. The connect packets are structured as follows:

Connect packet format

| Type | HopCount | SpanCount | Dest | Route |
|------|----------|-----------|------|-------|
| 2 | Total | Total | Dest | see above |

The Disconnect Packet

Disconnect packets are passed along an existing route in order to disconnect the route. They have the following structure:

Disconnect packet format

| Type | Timeslot | Width |
|------|----------|-------|
| 3 | timeslot | In STS-1s |

Local Data Structures

When a Request is in progress, every node typically receives request packets. When Request packets are forwarded from any outgoing port, the cost in terms of the number of nodes required to arrive at the new node is updated. The best, or least, cost attempted is saved in a table for each outgoing port. The Source and Destination nodes, however, do not maintain such a table. Instead, a complete table consisting of entries for all possible ports is instantiated in the source node for each unique Request. All values are initialized to a special "infinity" value (i.e., all bits set in the storage words) that represents a higher count than can be achieved.

Best transmitted cost per outgoing port

| Port | HopCount | SpanCount |
|------|----------|-----------|
| 0 | 255 | 255 |
| 1 | 255 | 255 |
| ... | ... | ... |
| N | 255 | 255 |

All nodes participating in a particular Request (including the Source and Destination nodes) have table entries for the best-so-far response to any pending request. The route is represented by stringing together the nodes (in order) and the ports and timeslots between them. The Destination node, since it appears separately, is not explicitly included in the Route field. Note that the route length is variable, but always contains SpanCount network elements and SpanCount ports. This table will have up to one entry for every pending Request, which is uniquely determined by Source and SeqNo.

Best Response per pending Request

| Source | SeqNo | Dest | HopCount | SpanCount | Route |
|--------|-------|------|----------|-----------|-------|
| 0 | 0 | 5 | 1 | 3 | N0, p1, N4, p2, N3/8, p3 |
| ... | ... | ... | ... | ... | ... |

Overview of Protocol Traffic Provisioning

When a traffic path is to be provisioned between two NEs, the protocol goes through three stages in establishing the route. Stage 1 is a "throttled flooding." In a true flooding scenario, packets are generated for each neighbor, for each neighbor's neighbor, etc., and the growth of packets is exponential. In this protocol, Requests are sent from the Source to each neighbor. There are, however, certain limitations (described below) which will prevent intermediate nodes from forwarding packets that represent poor or impossible routes.

Stage 2 (which may overlap chronologically with Stage 1), begins once the first Request packet has reached its intended Destination. The Destination node generates a Response and sends it on all its BLSR ports, i.e., CW working line 212 and CCW working line 216 in FIG. 2. The intermediate nodes are thus informed of the best routes known so far and can further limit their Request packets, which are still being forwarded as part of Stage 1. Stage 2 does not flood packets; it broadcasts to each neighbor, and each neighbor ignores duplicate requests.

Finally, Stage 3 begins once the Source node's timer has expired indicating that enough time has elapsed in trying to find a route. If a route was found, the Source node sends Connect packets on all its BLSR ports to finalize the best-cost route. On receipt of the Connect packet, nodes not involved in the route will cleanup their local data associated with the request, and forward the Connect packet to their neighbors. Nodes which are part of the route will set up the appropriate Cross-Connect, thereby establishing the route.

Referring now to FIGS. 5a-5f, flowcharts of Stage 1, Stage 2, and Stage 3 processing is shown to outline the processes performed to establish a traffic route between the source node and the destination node.

Stage 1: Source Node Processing

Figure 5A:
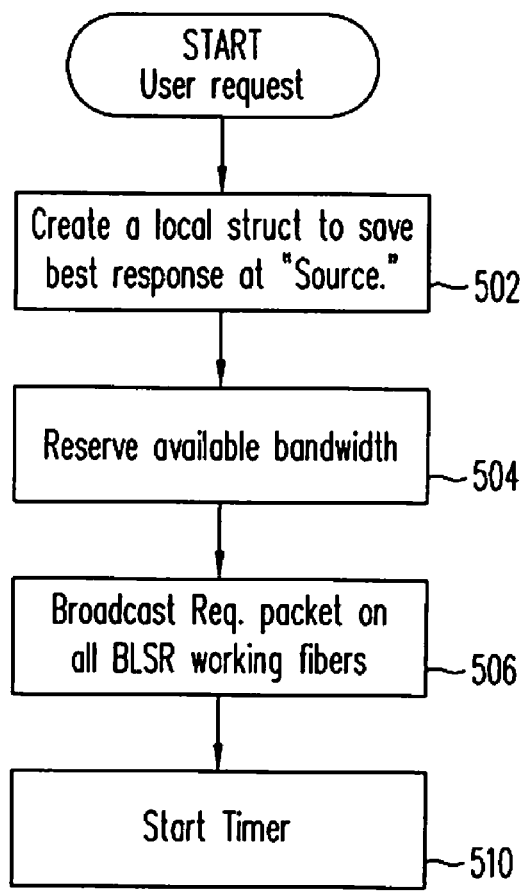
FIGS. 5a-5f are flowcharts of Stage 1, Stage 2, and Stage 3 processing to establish a traffic route between a source node and a destination node.
Figure 5F:
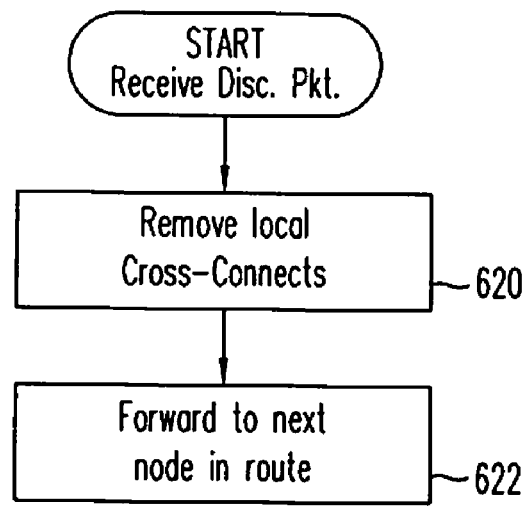

In Stage 1, when a command is issued to establish a traffic route between two nodes, the first node is arbitrarily taken as the Source. Referring to FIG. 5a, process 502 indicates that a local structure is created at the source node to store the best response. In process 504, bandwidth is reserved for broadcasting packets associated with establishing the route. Bandwidth is reserved by marking the Timeslot as belonging to a particular Source and SeqNo (a potential Cross-Connect). The forwarded packets are updated to append the node, Port, and Timeslot to the route. The Source node creates a Request packet, having a format such as shown above, and sets the HopCount and SpanCount fields to zero. The Destination field is filled in with the Node ID of the Destination node. The SeqNo field is filled in with 0, and then incremented by one on each subsequent request. It is allowed to cycle back to 0 if it reaches the upper limit on the value that may be stored in the space allotted. The Width field is the bandwidth requested in units of STS-1s. Timeout is the length of time that the Source node will wait for responses and is initialized to some reasonable value, for example, 10 seconds. The value for timeout may be preset or input by a user.

The source node then issues a Request packet on all working BLSR working fibers to neighboring nodes to establish a connection with the destination specified in the Request packet, as indicated in process 506.

The Source node broadcasts the Request in both clockwise and counterclockwise directions on each BLSR node it is connected to, but only if there is enough consecutive bandwidth available on that line. Before broadcasting the packets, however, the bandwidth will be locally reserved for the potential connection along each possible port. The bandwidth reservation is associated with the Source node and its SeqNo. These two pieces of data uniquely identify a particular pending request in the network. The Request packet is transmitted across the actual ports which would be used to establish the connection, that is, on the Protection lines 250, 254 (FIG. 2) if the request is for a Protection Channel Access (PCA) connection, otherwise on the Working lines 248, 252. A timer is then started as shown in process 510. The timer has a duration corresponding to the value in the Timeout field, to release the reserved bandwidth in case the node becomes isolated from further signaling.

A Source node should not generate a second request while a previous one is still pending. It is unlikely that there would be enough bandwidth to fulfill the request, and even if the bandwidth is available, it would probably be a less-than-optimal path. If the Source node has other requests pending, it should wait for those to finish before generating new ones. This also helps to limit the number of packets in the network at any one time.

Stage 1 Non-Source/Non-Destination Node Processing

Figure 6:
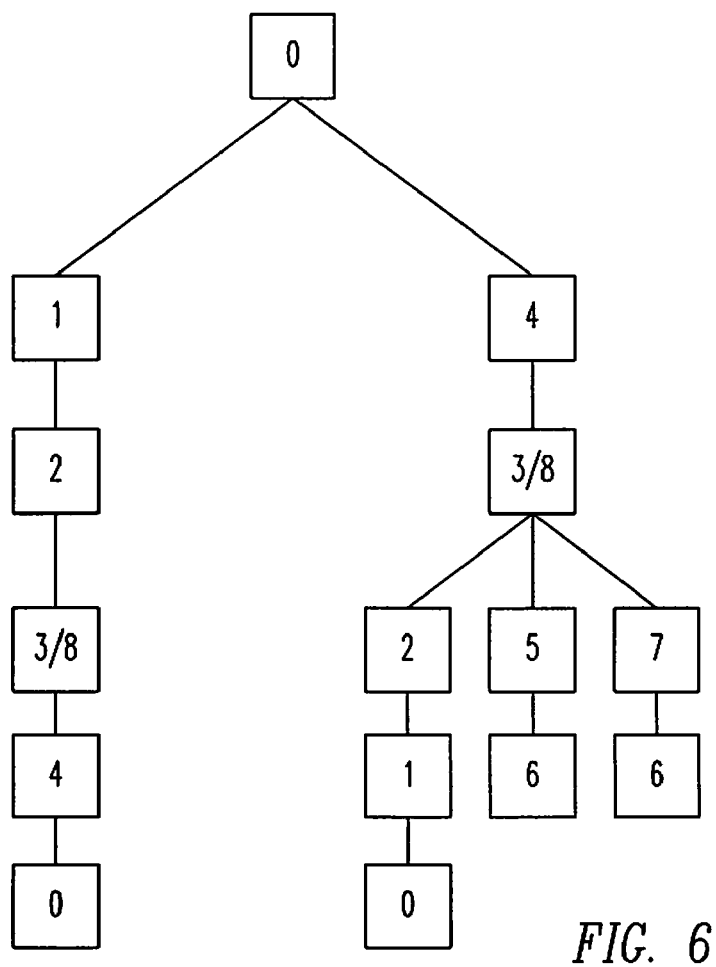
FIG. 6 is a diagram of potential routes between a source node 0 and a destination node 6 for the network in FIG. 1.

When any NE receives a Request packet, the Route field is first examined. If the node already appears in it, the packet is discarded to prevent path cycles. FIG. 6 shows an example of a tree of nodes that receive Request packets during a flooding broadcast for the network 100 in FIG. 1 using node 0 as the source node and node 6 as the destination node. The numbers in the boxes represent the nodes as numbered in FIG. 1. Paths are discarded when anode appears more than once in the path to prevent cycling through loop paths.

For example, referring to FIGS. 1 and 6, starting at node 0, the Request packet is broadcast to nodes 1 and 4, which are the nodes neighboring node 0. From node 1, the Request packet can be broadcast to node 2, but will not be broadcast to node 0 because the request packet was received on that fiber. Node 0 is thus discarded, as indicated in processes 504 and 506. Node 2 does not appear in the route so far, however, so the route field is updated and the Request packet is broadcast to network element 3/8. From network element 3/8, request packets may potentially sent to nodes 2, 4, 5, and 7, however, the request packet is only sent to node 4 because a better route cost wise through node 4 has already been found on the other branch from the source node through node 4, as discussed below in Stage 2 processing.

Referring again to FIG. 5*a*, if the node is the Destination node, a timer will be started with a duration that is longer than the Timeout value (the Source node's duration).

Figure 5B:
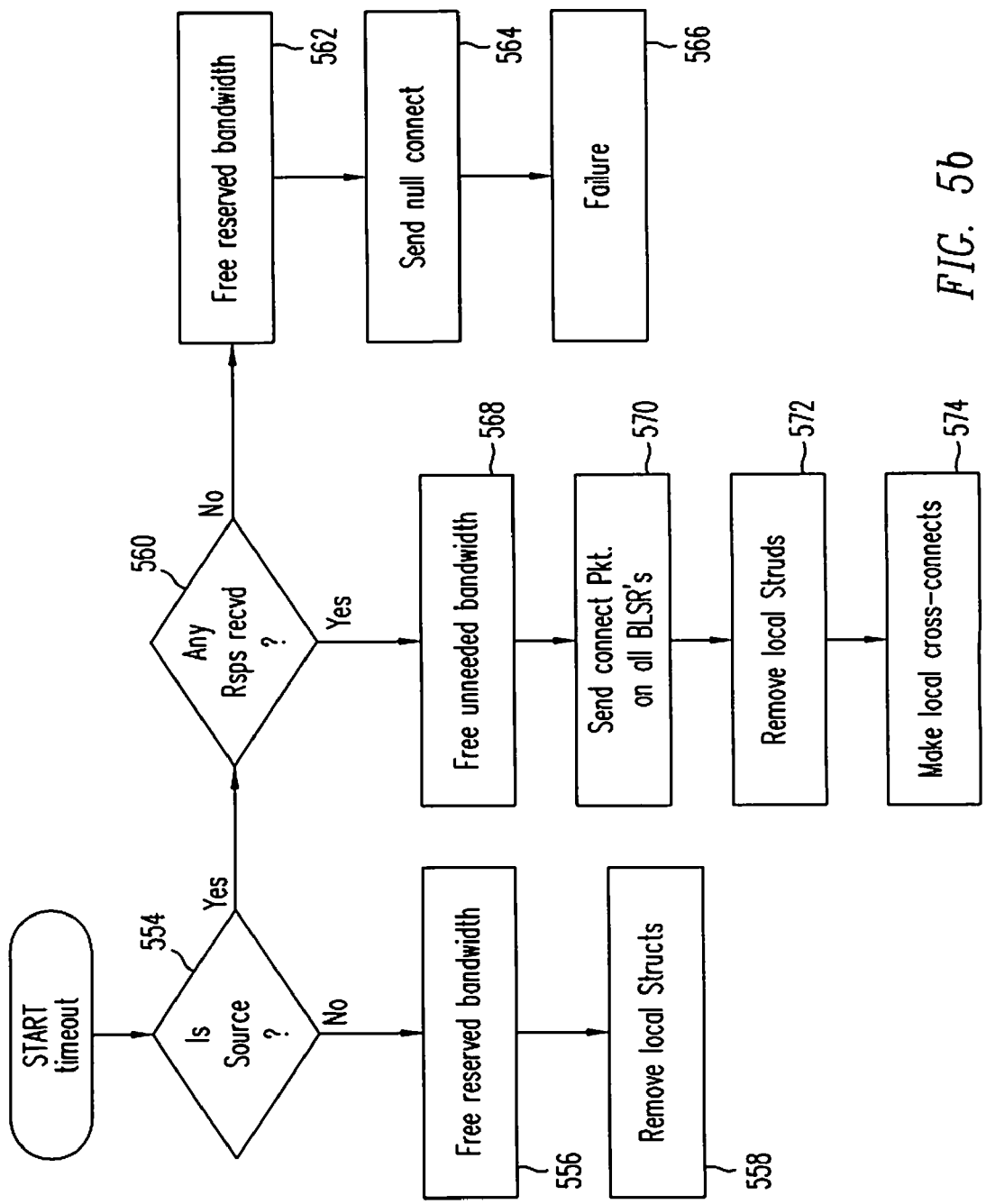

While request packets are being broadcast and response packets are being received by the source node, the timer is checked periodically. If the timer expires, control is passed to a timeout process. One embodiment of the timeout process is shown in FIG. 5*b*. In process 554, a test is performed to determine whether processing of the timeout is occurring at the source node (process 554). If not, then reserved bandwidth is made available (process 556), and the source node's local data structure is removed (process 558).

If processing is occurring in the source node, a test is performed to determine whether any response packets have been received in the source node (process 560). If not, then reserved bandwidth is made available (process 562), a null connect packet is broadcast (process 564), and a failure indication is issued (process 566). If the source node has received response packets, then reserved bandwidth is made available (process 568), connect packets are broadcast on all appropriate BLSR fibers (process 570), the source node's local data structure is removed (process 572), and cross-connections are established at nodes along the route (process 574), which is part of Stage 3 processing.

When a node is added to the route field in the Request packet, the SpanCount field is then increased by one. Assuming that (1) it is possible to continue the packet along the same ring, i.e., a Cross-Connect across the rings 102 and 104, for example, is possible, (2) that the total cost for the packet beats the best cost transmitted so far for that port, and (3) that the total cost for the packet requires at least one span traversal less than the best Response received in Stage 3 as described below, then bandwidth is set aside for it, the Port and Timeslot fields are appended to the route, and the Request packet is forwarded along the ring. The HopCount field is then incremented by one and the Request packet is rebroadcast to both sides of all other nodes in the network that have sufficient bandwidth. This is also subject to the following constraints: (1) the total cost for the outgoing packet must not be greater than the best cost previously transmitted from that port, and (2) the total cost for the packet is at least one span traversal better than the best Response received (see Stage 3). The Port and Timeslot fields are appended to route before it is transmitted from the new port(s).

Stage 2 Destination Node Processing

When a node receives a Request packet with itself in the Destination field, a local structure as described above is created to store the best-cost route for each pending Source and SeqNo. If the local structure exists, the existing structure is modified. If the cost associated with the received route is not lower than the current best cost, it is discarded. If the cost is lower, and if enough bandwidth is available, then bandwidth is reserved, and a response is broadcast on each BLSR including CW working line 212 and CCW working line 216. There are two reasons for doing this: (1) it prevents obviously poor routing choices from propagating before they can grow exponentially, and (2) it informs the Source that a route has been found. Note that the best routing choices are likely to arrive at the destination early on in the process, and thus, are likely to stop excessive Stage 1 flooding.

Figure 5C:
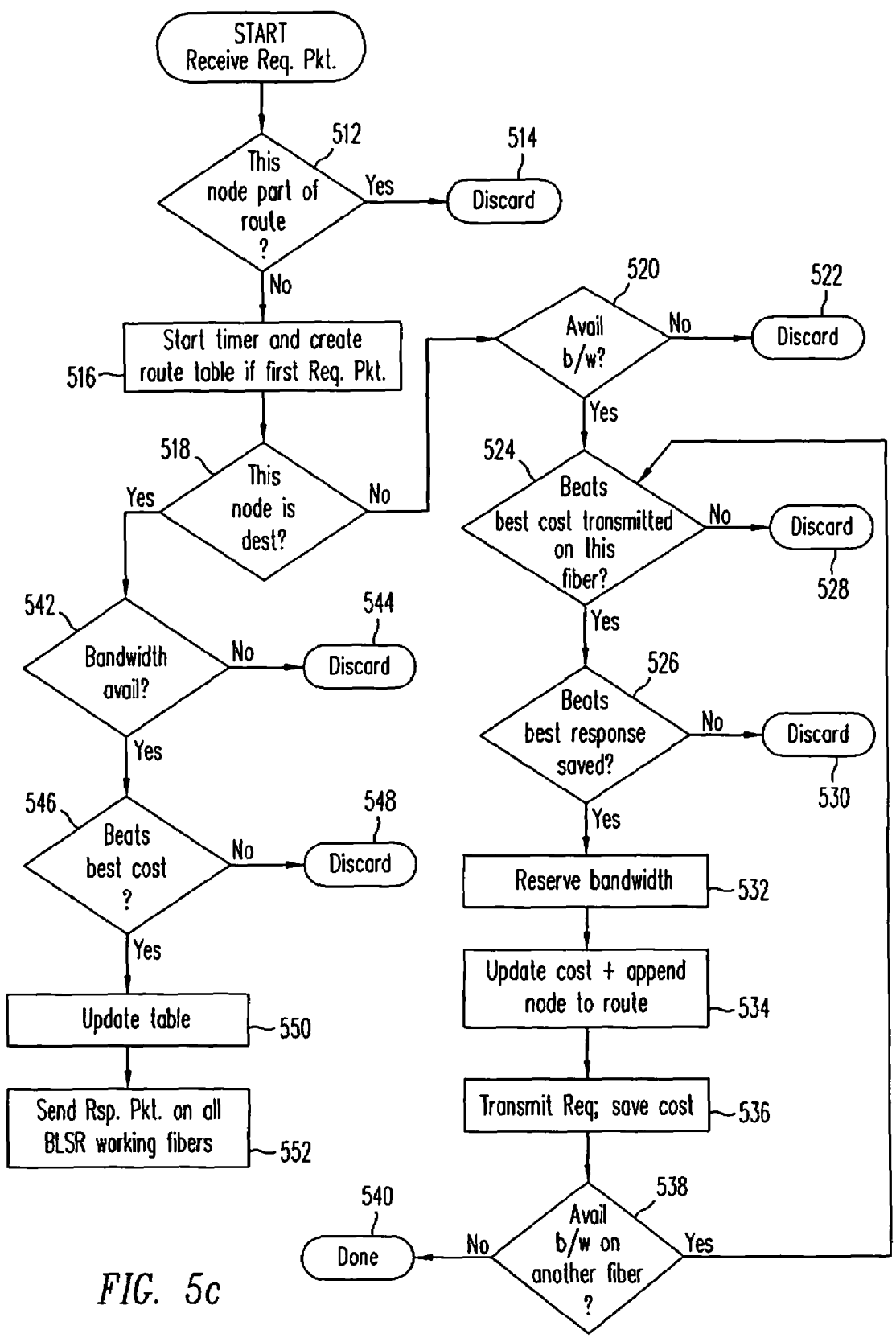

Referring now to FIG. 5*c*, when any NE receives a Request packet, the Route field is first examined. If the node already appears in it, the packet is discarded to prevent path cycles, as indicated by processes 512 and 514. A timer is started when the NE receives the first request packet (process 516).

Referring to process 518, if the node is the destination node, then a check is made to determine if bandwidth is available (process 542). If bandwidth is not available, the packet is discarded (process 544). If the bandwidth is available, a test is performed to determine whether the potential route in the packet just received has a lower cost than routes previously transmitted on the particular fiber (process 546). If not, then the packet is discarded (process 548). Otherwise, the local data structure on the node is updated with the new best cost and route (process 550), and a response packet is transmitted on appropriate fibers having the required amount of bandwidth available (process 552).

Stage 2 Non-Source/Non-Destination Node Processing

If the node is not the destination node (process 518), then a check is made to determine is bandwidth is available (process 520). If bandwidth is not available, the packet is discarded (process 522). If the bandwidth is available, a test is performed to determine whether the potential route in the packet just received has a lower cost than routes previously transmitted on the particular fiber (process 524), and whether the potential route has a lower cost than the route currently stored in the local data structure (process 526). If not, then the packet is discarded (processes 528 and 530). Otherwise, bandwidth is reserved (process 532), the local data structure on the node is updated with the new best cost and route (process 534), and the updated request packet is transmitted on appropriate fibers having the required amount of bandwidth are available (processes 536, 538, and 540).

In summary, when a NE receives a Response packet, it keeps the current best-cost for each Source and SeqNo (but only the Source needs to store the entire route). Each time a Response packet is received, the cost is compared with the current stored best cost. If the cost is less than the current best-cost, then the packet is forwarded on both sides of each BLSR CW working line 212 and CCW working line 216 (except on the port it was received on). The local table is then updated. Any requests which do not beat the current best cost are simply ignored.

Stage 3 Source Node Processing

The Source node examines all the completed routes that are returned to it via Response packets and saves the best one. When the Source node's timer expires, the source node will select the best-cost route and forward a Connect packet to all neighboring nodes. Then, it will relinquish its hold on unneeded bandwidth and provision the local Cross-Connect according to the first leg of the route.

If, however, no route was found before the Source node timed out, it will instead transmit a null Connect packet. That is, it broadcasts a Connect packet with a zero-length route. This will signal the other nodes to free up their reserved bandwidth and eliminate their data structures associated with the request. A negative response should be returned to provide an indication or warning that the request was not fulfilled.

Figure 5D:
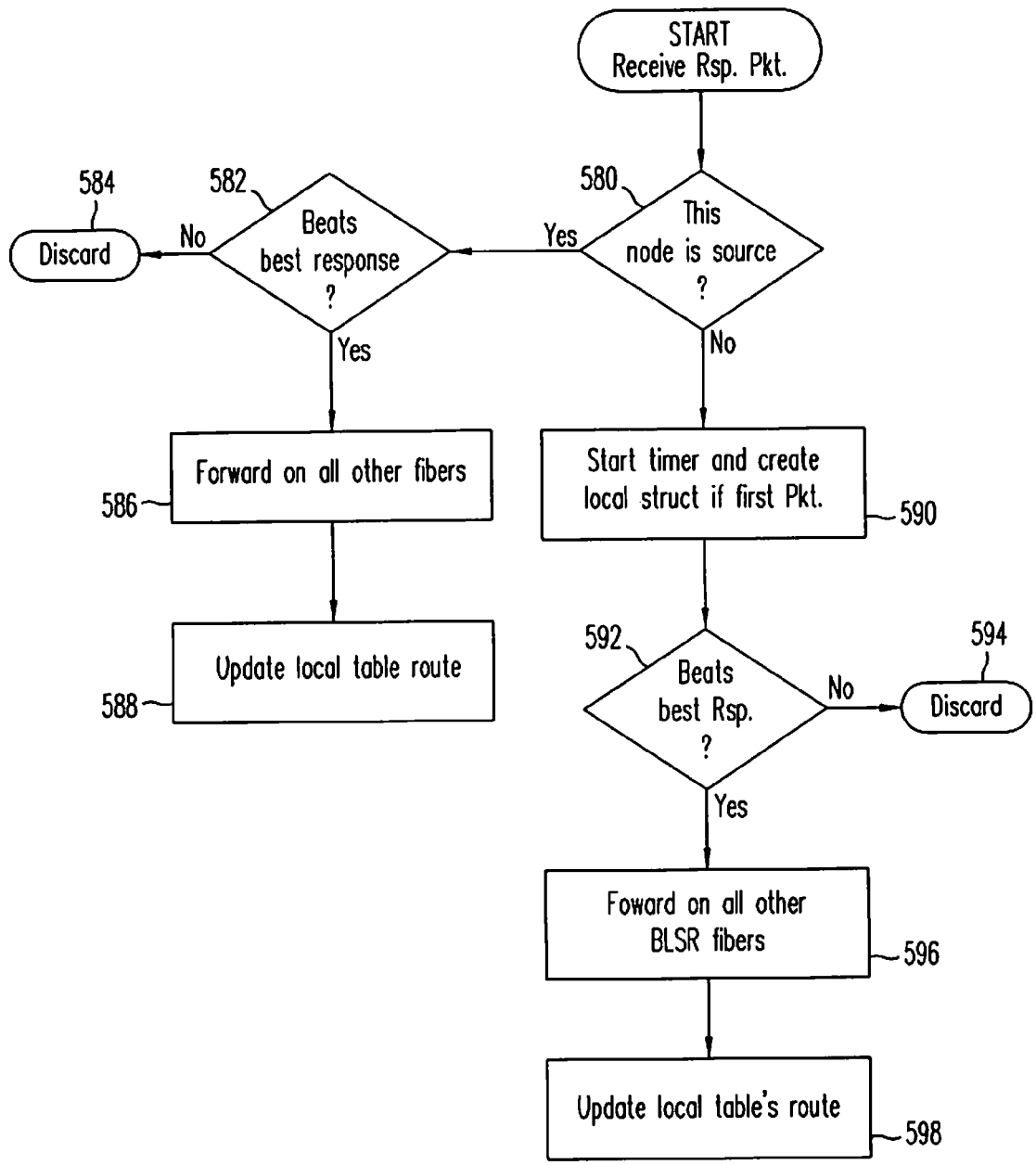

Referring to FIG. 5d, processing for the source node includes determining whether the potential route in the packet just received has a lower cost than routes previously transmitted on the particular fiber (process 582). If not, then the packet is discarded (process 584). Otherwise, the local data structure on the node is updated with the new best cost and route, and a response packet is transmitted on appropriate fibers having the required amount of bandwidth available (processes 586 and 588).

Stage 3 Non-Source Node Processing

Processing at a non-source node includes starting the timer and creating the local data structure when the first packet is received at the node (process 590). Next, it is determined whether the potential route in the packet just received has a lower cost than routes previously transmitted on the particular fiber (process 592). If not, then the packet is discarded (process 594). Otherwise, the local data structure on the node is updated with the new best cost and route, and a response packet is transmitted on appropriate fibers having the required amount of bandwidth available (processes 596 and 598).

Establishing Cross-Connects for a Traffic Path

Figure 5E:
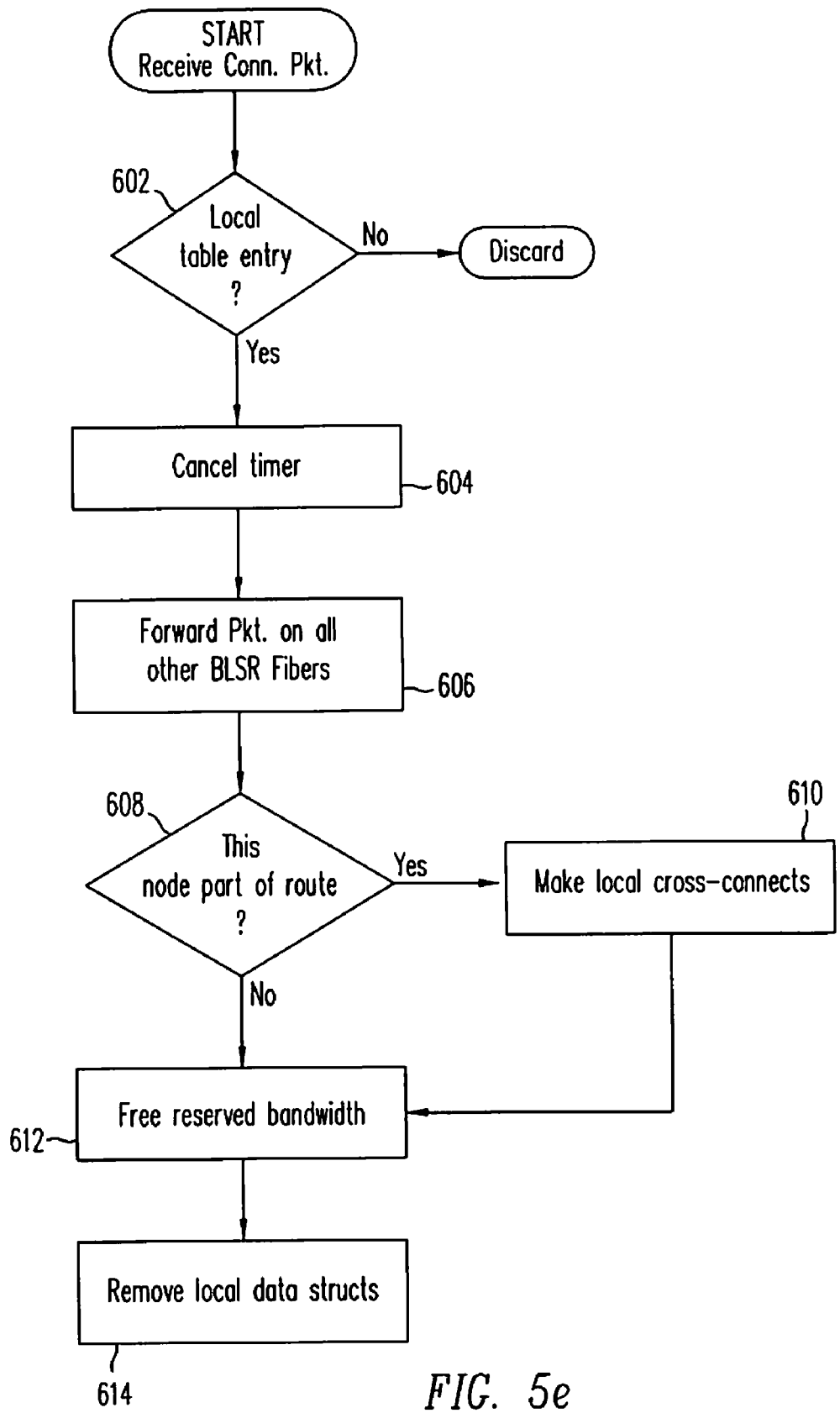

Referring now to FIG. 5e, when a node other than the source node receives a Connect packet, it will first look up the in-progress data structure associated with the Request/Response (process 602). If there is no such entry, the packet is discarded and no further processing is done. If the data structure does exist, then the timer is canceled (process 604) and the packet is forwarded on all BLSR ports except the one it was received on (process 606). Then if it is determined that the node appears in the Route (or is the Destination) (process 608), then the appropriate local Cross-Connect is made (process 610). Whether the node appears in the route or not, all unneeded bandwidth is freed up (process 612), and the local data structure is removed (process 614).

Note that if a node times out, it implies that it was somehow isolated from the other nodes during the signaling process. The action in this case is to simply remove the local data structure and free up any reserved bandwidth associated with the expired request.

This completes the protocol for establishing a traffic path across a BLSR network. Each node that is part of the route should send messages to indicate that a Cross-Connect was added.

Removing an Existing Traffic Path

To delete a traffic route, the Source node generates a Disconnect packet and transmits it out the port used by the traffic path. The local Cross-Connect is then deleted at each node in the path as indicated by process 620 in FIG. 5f. Each node that receives a Disconnect packet will retransmit it out the appropriate port (which is known by following the local Cross-Connect) as indicated by process 622. If the local Cross-Connect leads outside of a BLSR, then the packet is no longer forwarded; the destination has been reached and no further action is necessary.

Advantages

There are several advantages to the network protocol of the present invention. First, if optical fibers fail before, during, or after the establishment of a traffic path, the network will not be left in an indeterminate state. This is due to the features that provide an indication of whether or not a traffic route could be provisioned, and to the BLSR network which uses protection lines for transmitting data if a working line fails.

A second advantage is that the criterion for determining the least-cost route is to first minimize Ring Hops and then Span Traversals. Ring Hops are only made when there is no other alternative. Span Traversals are minimized in order to take the shorter path around a particular ring whenever possible.

A third advantage is that the entire process of establishing traffic routes across a network, although not time critical, finishes within a reasonable time. It also requires little memory at each node since no routing tables are kept. The process of establishing a traffic route is simple and the protocol uses as few packets as possible to accomplish its goal.

It is important to note that this protocol does not have to be executed in a time-critical fashion, and that it does not impact protection switching time. If fibers are cut during this process, for example, then when the routes are being established during Stage 3, they will be temporarily handled on the protection lines. This is part of the standard BLSR APS (Automatic Protection Switching) protocol, as known in the art.

It is also important to note that the present protocol performs best on networks with existing traffic because fewer packets are broadcast if there are existing connections already, i.e. the nodes already included in a path are not considered for another path. The presence of traffic may limit potential routes if there is a lack of bandwidth or if intra-ring TSI causes a node to be rejected from consideration without further propagation.

A fourth advantage of the present invention is that there is no centralized decision-making in the route determination, and nodes do not require information about other nodes. A node only "knows" which of its ports belong to a BLSR for that NE. Additionally, the local data structures that are used to determine whether a potential route has a lower cost than routes currently known is regenerated at each node for each request packet. The local data structures are independent from one another and thus do not become outdated based on route processing at other nodes.

A further advantage is that this protocol may be used in combination with manual provisioning. That is, some of the Cross-Connects in the network may have been manually provisioned, and others may have been automatically generated by the present protocol. Once established, all Cross-Connects are indistinguishable. Any traffic path, therefore, whether manually entered or automatically generated, can be removed by the Disconnect packets.

While the invention has been described with respect to the embodiments and variations set forth above, these embodiments and variations are illustrative and the invention is not to be considered limited in scope to these embodiments and variations. Accordingly, various other embodiments and modifications and improvements not described herein may be within the spirit and scope of the present invention, as defined by the following claims.

What is claimed is:

1. A source node comprising:
   a network interface operable to transmit packets and to receive packets;
   a processing unit in communication with the network interface, the processing unit being operable to generate a request packet that includes a request to provision a route for data packets, wherein the request packet includes:
   a value indicating the number of nodes included in the route;
   a value indicating the number of rings included in the route;
   a sequence number for each node in the route with respect to the source node;
   an identifier for a destination node; and
   an identifier for each node in the route.

2. The source node of claim 1, wherein the request packet further includes:
   a value representing the bandwidth required to establish cross-connects along the route.

3. The source node of claim 1, wherein the identifier for each node in the route is included in a route subfield, and the route subfield includes:
   a network element identifier for each node;
   a port identifier for each node; and
   a timeslot for each node.

4. The source node of claim 1, wherein the network interface is a Bi-Directional Line-Switched Ring (BLSR) network interface.

5. The source node of claim 4, wherein the source node is further operable to broadcast the request packet using the BLSR network interface.

6. The source node of claim 1, wherein the source node is further operable to reserve bandwidth for broadcasting the request packet.

7. The source node of claim 1, wherein the source node is further operable to receive a response packet, wherein the response packet includes:
   the value indicating the number of nodes included in the route;
   the value indicating the number of rings included in the route;
   the identifier for the destination node;
   the sequence number of each node in the route with respect to the source node; and
   the identifier for each node in the route.

8. The source node of claim 7, further comprising a local data structure that includes information regarding a route with the least cost.

9. The source node of claim 8, wherein the source node receives a plurality of response packets and stores information regarding the route with the least cost in the local data structure.

10. The source node of claim 9, wherein the source node broadcasts a packet including information regarding the route with the least cost.

11. The source node of claim 10, wherein the request packet further includes a timeout value, and the source node is further operable to generate a connect packet, wherein the connect packet includes:
    the value indicating the number of nodes included in the route with the least cost;
    the value indicating the number of rings included in the route with the least cost;
    the identifier of the destination node; and
    the identifiers for each node in the route with the least cost.

12. The source node of claim 11, wherein the source node is further operable to start a timer and broadcast the connect packet when the timeout value has been reached on the timer.

13. The source node of claim 9, wherein the source node is further operable to generate a disconnect packet, wherein the disconnect packet includes:
    the timeslot of a node included in a route to be dismantled; and
    a value indicating the bandwidth required to transmit the disconnect packet.

14. The source node of claim 13, wherein the source node is further operable to broadcast the disconnect packet to the route to be dismantled.

15. A destination node comprising:
    a network interface operable to transmit packets and to receive packets;
    a processing unit in communication with the network interface, the processing unit being operable to generate a response packet subsequent to receiving a request to provision a route for data packets, wherein the response packet includes:
    a value indicating the number of nodes included in the route;
    a value indicating the number of rings included in the route;
    an identifier for a destination node;
    a sequence number of each node in the route with respect to a source node; and
    an identifier for each node in the route.

16. The destination node of claim 15, further comprising a local data structure that includes information regarding a route with the least cost.

17. The destination node of claim 16, wherein the destination node is further operable to transmit the response packet when a route in a received packet has a lower cost than the route in the local data structure.

18. The destination node of claim 17, wherein the destination node is further operable to update the local data structure with the route in the received packet when the route in the received packet has a lower cost than the route in the local data structure.

19. A method for provisioning a route with at least one intermediate node, wherein the intermediate node is operable to communicate with at least one neighboring node in a network, and wherein packets are communicated along the route, the method comprising:
receiving a response packet in the intermediate node, wherein the response packet includes information regarding a candidate route;
comparing the information regarding the candidate route to information regarding a previous route in the intermediate node;
determining whether the candidate route has a lower cost than the previous route in the intermediate node.

20. The method of claim 19 further comprising:
broadcasting the response packet when the candidate route in the response packet has a lower cost than the previous route; and
updating the information regarding the previous route in the intermediate node with the information regarding the candidate route when the cost of the candidate route is lower than the cost of the previous route.

21. An intermediate node comprising:
a network interface operable to transmit packets and to receive packets along a route; and
a processing unit in communication with the network interface, wherein the processing unit is configured to store data in a local data structure that includes route information regarding a route between a source node and a destination node with the least known cost;
wherein the intermediate node is operable to receive a request packet, compare route information in the request packet with the route information in the local data structure, and transmit the request packet when the route in the request packet has a lower cost than the route in the local data structure.

22. The intermediate node of claim 21, wherein the intermediate node is further operable to update the local data structure with the route in the request packet when the route in the request packet has a lower cost than the route in the local data structure.

23. The intermediate node of claim 21 wherein the intermediate node is further operable to update the request packet with the route in the local data structure when the route in the local data structure has a lower cost than the route in the request packet.

24. A method for provisioning a route from a source node, wherein the source node is operable to communicate with at least one neighboring node in a network, and wherein packets are communicated along the route, the method comprising:
generating a request packet that includes a request to provision the route for the packets; and
broadcasting the request packet to the at least one neighboring node, wherein the request packet includes:
a value indicating the number of nodes included in the route;
a value indicating the number of rings included in the route;
a sequence number for each node in the route with respect to the source node;
an identifier for a destination node; and
an identifier for each node in the route.

25. The method of claim 24, further comprising:
determining bandwidth required to establish cross-connects along the route.

26. The method of claim 25, wherein the network is a BLSR SONET network.

27. The method of claim 25, further comprising:
reserving bandwidth for communicating the request packet.

28. The method of claim 24, wherein the identifier for each node in the route is included in a route subfield, and the route subfield includes:
a network element identifier for each node;
a port identifier for each node; and
a timeslot for each node.

29. A method for provisioning a route with a destination node, wherein the destination node is operable to communicate with at least one neighboring node in a network, and wherein packets are communicated along the route, the method comprising:
receiving a request to provision the route in the destination node, wherein the request includes information regarding a candidate route;
comparing the information regarding the candidate route to information regarding a previous route in the destination node;
determining whether the candidate route has a lower cost than the previous route;
updating the information regarding the previous route in the destination node with the information regarding the candidate route when the cost of the candidate route is lower than the cost of the previous route; and
generating a response packet when the information regarding the candidate route is updated with the information regarding the previous route.

30. The method of claim 29, wherein the response packet includes:
a value indicating the number of nodes included in the route;
a value indicating the number of rings included in the route;
an identifier for the destination node;
a sequence number of each node in the route with respect to a source node; and
an identifier for each node in the route.

31. The method of claim 29 further comprising:
broadcasting the response packet to the at least one neighboring node.

32. A method for provisioning a route from a source node, wherein the source node is operable to communicate with at least one neighboring node in a network, and wherein packets are communicated along the route, the method comprising:
generating a request packet that includes a request to provision the route for the packets;
broadcasting the request packet to the at least one neighboring node;
determining bandwidth required to establish cross-connects along the route; and
receiving a response packet, wherein the response packet includes:
a value indicating the number of nodes included in the route;
a value indicating the number of rings included in the route;
an identifier for a destination node;

a sequence number of each node in the route with respect to a source node; and an identifier for each node in the route.

33. The method of claim 32, further comprising:

generating a local data structure that includes information regarding a route with the least cost; and storing information regarding the route with the least cost in the local data structure.

34. The method of claim 33, wherein the source node receives a plurality of response packets, the method further comprising:

comparing the cost of a route in each response packet to a cost of the route in the local data structure; and updating the local data structure with the route in one of the response packets when the route in the one of the response packets has a lower cost than the route in the local data structure.

35. The method of claim 34, further comprising:

broadcasting a packet including information regarding the route with the least cost from the source node.

36. The method of claim 35, wherein the request packet further includes a timeout value, the method further comprising:

generating a connect packet, wherein the connect packet includes:

the value indicating the number of nodes included in the route with the least cost;

the value indicating the number of rings included in the route with the least cost;

the identifier of the destination node; and the identifiers for each node in the route with the least cost.

37. The method of claim 36 further comprising:

starting a timer when a first request packet is broadcast; and broadcasting the connect packet when a timeout value has been reached on the timer.

38. The method of claim 33, further comprising:

generating a disconnect packet, wherein the disconnect packet includes:

a timeslot of a node included in a route to be dismantled; and a value indicating the bandwidth required to transmit the disconnect packet.

39. The method of claim 38 further comprising:

broadcasting the disconnect packet to nodes in the route to be dismantled.

40. A method for dismantling a traffic route in a network, the method comprising:

generating a disconnect packet, wherein the disconnect packet includes:

a timeslot of a node included in a route to be dismantled; and a value indicating the bandwidth required to transmit the disconnect packet.

41. The method of claim 40 further comprising:

broadcasting the disconnect packet to nodes in the route to be dismantled.

42. A method for provisioning a route with at least one intermediate node, wherein the intermediate node is operable to communicate with at least one neighboring node in a network, and wherein packets are communicated along the route, the method comprising:

receiving a request packet comprising a request to provision the route in the intermediate node, wherein the request packet includes information regarding a candidate route;

comparing the information regarding the candidate route to information regarding a previous route in the intermediate node;

determining whether the candidate route has a lower cost than the previous route in the intermediate node;

updating the information regarding the previous route in the intermediate node with the information regarding the candidate route when the cost of the candidate route is lower than the cost of the previous route; and adding the intermediate node to the route in the request packet when the cost of the candidate route is lower than the cost of the previous route.

43. The method of claim 42 wherein the network is a four fiber BLSR network.

44. The method of claim 43 wherein determining whether the candidate route has a lower cost than the previous route in the intermediate node includes:

determining whether the candidate route has a lower cost than the previous route transmitted on a particular fiber in the intermediate node.

45. The method of claim 42 further comprising:

broadcasting the request packet when the route in the request packet has a lower cost than the previous route.

* * * * *